United States Patent
McDade

(10) Patent No.: US 11,512,437 B2
(45) Date of Patent: Nov. 29, 2022

(54) COMPOSITIONS AND METHODS FOR REDUCING THE AMOUNT OF ASPHALT EMULSION NEEDED FOR RECYCLING AND STABILIZING ROADWAY MATERIALS

(71) Applicant: Billy Shane McDade, Lakeway, TX (US)

(72) Inventor: Billy Shane McDade, Lakeway, TX (US)

( * ) Notice: Subject to any disclaimer, the term of this patent is extended or adjusted under 35 U.S.C. 154(b) by 0 days.

(21) Appl. No.: 15/331,903

(22) Filed: Oct. 23, 2016

(65) Prior Publication Data

US 2017/0292226 A1    Oct. 12, 2017

Related U.S. Application Data

(60) Provisional application No. 62/245,973, filed on Oct. 23, 2015.

(51) Int. Cl.
| | | |
|---|---|---|
| *E01C 3/00* | (2006.01) | |
| *C04B 18/08* | (2006.01) | |
| *C04B 24/36* | (2006.01) | |
| *C04B 26/26* | (2006.01) | |
| *C08L 95/00* | (2006.01) | |
| *C04B 111/00* | (2006.01) | |

(52) U.S. Cl.
CPC .............. *E01C 3/003* (2013.01); *C04B 18/08* (2013.01); *C04B 24/36* (2013.01); *C04B 26/26* (2013.01); *C08L 95/005* (2013.01); *C04B 2111/0075* (2013.01); *C08L 2555/34* (2013.01)

(58) Field of Classification Search
CPC ...... E01C 3/003; C08L 95/00; C08L 2555/34; C08L 2666/74; C08L 95/005; C09D 195/00; C04B 26/26
See application file for complete search history.

(56) References Cited

U.S. PATENT DOCUMENTS

| | | | | |
|---|---|---|---|---|
| 3,344,056 A | * | 9/1967 | Rostler | C10C 3/00 106/277 |
| 3,825,513 A | * | 7/1974 | Rostler | C08J 3/03 524/60 |
| 4,021,393 A | * | 5/1977 | McDonald | C08L 95/00 106/273.1 |
| 5,811,477 A | * | 9/1998 | Burris | C08L 95/00 521/41 |
| 7,357,597 B2 | * | 4/2008 | Face, III | E01C 19/42 404/118 |
| 2013/0195552 A1 | * | 8/2013 | McDade | E01C 7/187 404/75 |

OTHER PUBLICATIONS

"Geotechnical Aspects of Pavements Reference Manual" Appendix F: Determination of Admixture Content for Subgrade Stabilization. Bridges and Structures Federal Highway Administration. NHI-05-037. Oct. 25, 1994 (Year: 1994).*
Utilization of Recycled Asphalt in Cold Mixes and Cold In-Place Recycling Processes Guidelines Aug. 2012. https://suma.org/img/uploads/documents/communities_of_tomorrow/Cold%20Mix%20Guidelines.pdf (Year: 2012).*

* cited by examiner

*Primary Examiner* — Alexandra M Moore
(74) *Attorney, Agent, or Firm* — Buchanan Ingersoll & Rooney PC

(57) ABSTRACT

Disclosed herein are formulations for, and methods of making and using compositions formulated through the use of maltenes to lower the required asphalt emulsion content for recycling and stabilization of roadway materials as herein disclosed.

5 Claims, No Drawings

COMPOSITIONS AND METHODS FOR REDUCING THE AMOUNT OF ASPHALT EMULSION NEEDED FOR RECYCLING AND STABILIZING ROADWAY MATERIALS

CROSS-REFERENCE TO RELATED APPLICATIONS

This application claims the benefit under Title 35 United States Code § 119(e) of U.S. Provisional Patent Application Ser. No. 62/245,973; Filed: Oct. 23, 2015, the full disclosure of which is incorporated herein by reference.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATING-BY-REFERENCE OF MATERIAL SUBMITTED ON A COMPACT DISC

Not applicable

SEQUENCE LISTING

Not applicable

FIELD OF THE INVENTION

The present disclosure generally relates to formulations for, and methods of recycling and stabilizing roadway materials. More specifically, the present invention generally relates to formulations for, and methods of making and using roadway materials through the use of an additive for reducing the amount of emulsion needed compared to existing methods and compositions known in the art for recycling and stabilizing roadway materials to achieve equal or improved production, quality, and performance of said recycled and stabilized roadway materials.

BACKGROUND OF THE INVENTION

Without limiting the scope of the disclosed formulations and methods, the background is described in connection with novel formulations and methods of making and using roadway materials through the use of an additive for reducing the amount of emulsion needed compared to existing methods and compositions known in the art for recycling and stabilizing roadway materials to achieve equal or improved production, quality, and performance of said recycled and stabilized roadway materials.

It is an object of the invention to provide alternative formulations and methods of recycling and stabilizing roadway materials with equal or improved performance and quality than conventional methods currently being used for recycling and stabilizing roadway materials while using less asphalt emulsion.

Maltenes by definition are the oily, resinous component of asphalt that remains when the asphaltenes are removed. In addition, maltenes have been described to constitute the fraction of asphalt, which is soluble in n-alkane solvent such as pentane or heptane. Maltenes are known in the art. Maltenes are the chemical fractions of asphalt (derived from crude oil) that make asphalt lively, that is, give it flexibility and moisture resistance. Old, cracked asphaltic paving material is often said to be oxidized, which is the process of maltene loss.

Maltenes may be isolated from the larger asphalt structure during refining, and have been for many years. These maltenes are sold commercially, typically as a roadway surface treatment to retard oxidation or as an additive to liquid asphalt binder. They are often emulsified before sale and sold under brand names such as "Reclamite". In non-emulsified form they are sold under brand names such as "Reclamite-B" or "Hydrolene".

The amount of emulsion utilized in the recycling and stabilizing of roadway materials is a considerable cost in the process. A reduction in the amount of emulsion required in this process improves the cost effectiveness. Current approaches concentrate on the appropriate type of asphalt emulsion needed to perform a specific recycling or stabilization process and not on reducing the amount of emulsion required. By lowering the amount of emulsion required, the cost of roadway construction is drastically reduced. In addition, the environmental impact is reduced by lowering the amount of emulsion that must be transported typically by tankers and tractor trailers. This reduces the amount of fossil fuels burned.

What is desired, therefore, is a formulation and method of making and using roadway materials through the use of an additive for reducing the amount of emulsion needed compared to existing methods and compositions known in the art for recycling and stabilizing roadway materials to achieve equal or improved production, quality, and performance of said recycled and stabilized roadway materials.

The information included in this background section of the specification is included for technical reference purposes only and is not to be regarded as subject matter by which the scope of the description is to be bound or as an admission of prior art.

BRIEF SUMMARY OF THE INVENTION

Accordingly, it is an object of the present invention to provide alternative formulations and methods of recycling and stabilizing roadway materials with equal or improved performance and quality than conventional methods currently being used for recycling and stabilizing roadway materials while using less asphalt emulsion.

In summary, the present invention discloses novel formulations/compositions and methods of making and using roadway materials through the use of maltenes having the effect of lowering the amount of emulsion needed to achieve the required strength. The use of added maltenes to various commodity emulsions has the effect of lowering the amount of emulsion needed to achieve the desired material strength.

The addition of maltenes to lower the needed emulsion content is applicable whether the emulsion is being used to recycle/reclaim 100% reclaimed asphalt pavement (RAP), 100% base, or a mixture of the two.

DETAILED DESCRIPTION OF THE INVENTION

Disclosed herein are novel formulations for, and methods of making and using recycled and/or stabilized roadway materials utilizing an additive for reducing the amount of emulsion needed compared to existing methods and compositions known in the art for recycling and stabilizing roadway materials to achieve equal or improved production, quality, and performance of said recycled and stabilized roadway materials.

The numerous innovative teachings of the present invention will be described with particular reference to several embodiments (by way of example, and not of limitation).

Disclosed herein are compositions and approaches utilizing maltenes as an additive to rejuvenate reclaimed asphaltic roadway materials during their recycling. That is, make the reclaimed asphaltic roadway materials usable again for a paving material or roadway maintenance material. In addition, also disclosed herein is the use of maltenes for lowering the amount of asphalt emulsion it takes to recycle and/or stabilize roadway materials, including not just RAP, but also RAP/base mixtures (a process usually referred to as Full-depth Reclamation (FDR)) and 100% percent base mixtures.

For given requirements, specifications, and/or applications of roadway materials, utilizing methods and approaches known in the art, a proper emulsion is identified. When the term emulsion is used, the broad category of emulsions for recycling and stabilizing roadway materials are encompassed. Examples of emulsions include, but are not limited to, CSS-1H, SS-1H, SS-1, and high float emulsions such as, but not limited to, CHFE-300, HFE-300, and HFE-300P.

The term roadway materials are used to encompass virgin base materials such as crushed aggregate base and also in situ road components such as base materials and asphalt concrete pavement. It can also include previously reclaimed roadway materials such as reclaimed asphalt pavements (RAP).

The use of added maltenes to various commodity emulsions has the effect of lowering the amount of emulsion needed to achieve the desired material strength. Table 1, 2, and 3 illustrate as examples and not limitations, various compositions and applications of the claimed invention. Base compositions are shown and contrasted with the modification of maltenes added to the composition. The percentage of added maltenes reflect the weight as a percentage of the stock asphalt in the emulsion. Maltene addition may be added for example, and not a limitation, by taking the base asphalt and adding the maltenic base. In addition, an emulsified maltene may be added into an asphalt emulsion. The percentage range of maltenes added may be in the range of about 0.5% to 100%.

Table 1 reflects the use of CSS-1H emulsion and shows the unconfined compressive strength of 88% base and 22% reclaimed asphalt material at various emulsion contents. Illustrated here is that at 1.5% emulsion content by weight of the roadway materials with 3% added maltenes, an unconfined compressive strength of 163 psi is achieved. This is higher than the other six data points with no maltenes added and higher emulsion content. As with any mix design process, the method or process is to adjust the maltene content to make the composition most effective. Mix design testing and testing of various emulsions will also determine if the type and chemical makeup of any given emulsion will benefit from the addition of any maltenes regarding lowering the content needed of that type of emulsion to recycle or stabilize the roadway materials.

Table 2 reflects the use of CSS-1H emulsion and shows the unconfined compressive strength of 100% base material at various emulsion contents. Illustrated here is that at for each emulsion percentage (6.30% and 3.00%), with the addition of the 2% maltenes to the composition, a higher unconfined compressive strength of the composition is achieved. A higher unconfined compressive strength is achieved at a lower emulsion content percentage of the composition when maltenes are added to the composition.

Table 3 reflects the Marshall stability of 100% reclaimed asphalt pavement (RAP) material at various emulsion contents. Again, illustrated here is that with the addition of maltenes to the composition, a higher unconfined compressive strength is achieved at a lower emulsion content percentage. As one skilled in art will appreciate, this drastically lowers the cost of roadway construction. That is, these compositions and methods improves the cost effectiveness of using asphalt emulsions to recycle or stabilize roadway materials by reducing the amount of emulsion needed in the process. In these examples, it is shown the addition of maltenic compounds reduces the overall amount of emulsion needed to perform a specific roadway recycling or stabilization task by 40-70%, however performance outside these ranges is achievable as well.

This approach and formulation/composition is in contrast to current technologies which concentrate on the appropriate type of asphalt emulsion needed to perform a specific recycling or stabilization process and not on the reduction of emulsion needed for the process or composition.

The addition of maltenes to lower the needed emulsion content is applicable whether the emulsion is being used to recycle/reclaim 100% RAP, 100% base, or a mixture of the two.

TABLE 1

Unconfined compressive strength (psi) of 88% base 22% reclaimed asphalt material at various emulsion contents. 120-150 psi is considered minimum standard

| Emulsion content by weight of stabilized roadway materials | 5.00% | 4.50% | 4.00% | 3.00% | 2.50% | 2.00% | 1.50% |
|---|---|---|---|---|---|---|---|
| CSS-1H, no added maltenes | 124 | 127 | 120 | | | | |
| CSS-1H + 1.5% cement, no added maltenes | 152 | 156 | 140 | | | | |
| CSS-1H + 3% added maltenes by weight of the stock asphalt in the emulsion | | | | | 141 | 142 | 163 |

TABLE 2

Unconfined compressive strength (psi) of 100% base material at various emulsion contents. 120-150 psi is considered minimum standard

| Emulsion content by weight of stabilized roadway materials | 6.30% | 3.00% |
|---|---|---|
| CSS-1H + 3% added fly ash, no added maltenes | 163 | |
| CSS-1H + 2% added maltenes by weight of the stock asphalt in the emulsion | | 261 |

TABLE 3

Marshall stability (psi) of 100% reclaimed asphalt pavement (RAP) material at various emulsion contents. 1250 psi is considered minimum standard

| Emulsion content by weight of stabilized roadway materials | 4.00% | 3.50% | 3.00% | 2.50% | 2.00% | 1.50% |
|---|---|---|---|---|---|---|
| CMS-2S, no added maltenes (does contain diesel fuel) | 1025 | 1260 | 1360 | 1550 | | |
| CSS-1H + 6% added maltenes by weight of the stock asphalt in the emulsion | | | | 1375 | 1550 | 1675 |

In some embodiments, maltene treated emulsions may be diluted and the diluted product added at higher application rates. This still has the net effect of lowering the emulsion content.

In brief, the invention is directed to formulations for, and methods of making and using roadway materials through the use of an additive for reducing the amount of emulsion needed compared to existing methods and compositions known in the art for recycling and stabilizing roadway materials to achieve equal or improved production, quality, and performance of said recycled and stabilized roadway materials.

The disclosed compositions and method is generally described, with examples incorporated as particular embodiments of the invention and to demonstrate the practice and advantages thereof. It is understood that the examples are given by way of illustration and are not intended to limit the specification or the claims in any manner.

To facilitate the understanding of this invention, a number of terms may be defined below. Terms defined herein have meanings as commonly understood by a person of ordinary skill in the areas relevant to the present invention. Terms such as "a", "an", and "the" are not intended to refer to only a singular entity, but include the general class of which a specific example may be used for illustration. The terminology herein is used to describe specific embodiments of the invention, but their usage does not delimit the disclosed formulations, compositions, and/or methods of use, except as may be outlined in the claims.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific systems and methods described herein. Such equivalents are considered to be within the scope of this invention and are covered by the claims.

All publications, references, patents, and patent applications mentioned in the specification are indicative of the level of those skilled in the art to which this invention pertains. All publications, references, patents, and patent application are herein incorporated by reference to the same extent as if each individual publication, reference, patent, or patent application was specifically and individually indicated to be incorporated by reference.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases.

The formulations, compositions, and/or methods of use disclosed and claimed herein can be made and executed without undue experimentation in light of the present disclosure. While the compositions, formulations, and methods of this invention have been described in terms of preferred embodiments, it will be apparent to those skilled in the art that variations may be applied to the formulations, compositions, and/or methods in the steps or in the sequence of steps of the method described herein without departing from the concept, spirit, and scope of the invention.

More specifically, it will be apparent that certain components, which are both shape and material related, may be substituted for the components described herein while the same or similar results would be achieved. All such similar substitutes and modifications apparent to those skilled in the art are deemed to be within the spirit, scope, and concept of the invention as defined by the appended claims.

What is claimed is:

1. A method of using maltene compounds, comprising:
   a) determining an amount of CSS-1H required to add to a roadway material composition to achieve a predetermined unconfined compressive strength and/or a predetermined Marshall Stability for the roadway material composition, the roadway material composition consisting of virgin base material;
   b) determining an amount of maltene compounds to be added to a roadway material mixture, the roadway material mixture containing CSS-1H that is less than the amount of CSS-1H required to add to the roadway material composition in step a), the amount of maltene compounds being such that roadway material made from the roadway material mixture exhibits the predetermined unconfined compressive strength and/or the predetermined Marshall Stability of the roadway material composition used in step a); and
   c) adding the amount of maltene compounds determined in step b) to the roadway material mixture, wherein the amount of maltene compounds is at least 2.00% by weight of the CSS-1H in the roadway material mixture.

2. The method recited in claim 1, wherein CSS-1H within the roadway material mixture is within a range from 40% to 70% less than the CSS-1H required to add to the roadway material composition.

3. The method recited in claim 1, wherein:
   the roadway material mixture contains CSS-1H that is 3.00% or less by weight of the roadway material composition; and
   the predetermined unconfined compressive strength of the roadway material composition is at least 150 pounds per square inch.

4. The method recited in claim 1, wherein the roadway material composition does not have old, cracked asphaltic paving material.

5. The method recited in claim 1, wherein the maltene compounds are within a range from 2.00% to 3.00% by weight of the CSS-1H contained in the roadway material mixture.

* * * * *